US006999687B2

United States Patent
Tsai

(10) Patent No.: US 6,999,687 B2
(45) Date of Patent: Feb. 14, 2006

(54) OPTICAL RECEIVING DEVICE

(75) Inventor: Chia-Ming Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 37 days.

(21) Appl. No.: 10/745,655

(22) Filed: Dec. 29, 2003

(65) Prior Publication Data

US 2005/0095013 A1    May 5, 2005

(30) Foreign Application Priority Data

Nov. 4, 2003  (TW) .............................. 92130742 A

(51) Int. Cl.
*H04B 10/06*    (2006.01)
*H01J 40/14*    (2006.01)
(52) U.S. Cl. ...................... 398/202; 398/208; 398/209; 250/214 AG
(58) Field of Classification Search ................ 398/202, 398/208, 209; 250/214 AG; 372/29.011, 372/29.015, 38.01, 38.07; 375/319; 455/341, 455/334; 330/59
See application file for complete search history.

(56) References Cited

U.S. PATENT DOCUMENTS

| | | | | |
|---|---|---|---|---|
| 4,939,475 A | * | 7/1990 | Prasse et al. | .................. 330/59 |
| 5,008,524 A | * | 4/1991 | Reutter et al. | .......... 250/214 A |
| 5,239,402 A | * | 8/1993 | Little et al. | .................. 398/202 |
| 5,917,639 A | * | 6/1999 | Ushirozawa | ................ 398/209 |
| 6,396,614 B1 | * | 5/2002 | Yoshizawa | .................. 398/202 |
| 6,684,032 B1 | * | 1/2004 | Umeda | ........................ 398/202 |
| 2004/0036537 A1 | * | 2/2004 | Forsberg | ..................... 330/308 |

* cited by examiner

*Primary Examiner*—Jason Chan
*Assistant Examiner*—Dalzid Singh
(74) *Attorney, Agent, or Firm*—Birch, Stewart, Kolasch & Birch, LLP

(57) ABSTRACT

An optical receiving device. The optical receiving device has a photodiode, transimpedance amplifier, and a feedback component. The photodiode has a first terminal coupled to a voltage source and a second terminal. When detecting an optical signal, the photodiode generates a current signal output from the second terminal. The transimpedance amplifier converts the current signal to a voltage signal and outputs the voltage. The feedback component is coupled between the first terminal and a input terminal of the transimpedance amplifier. The feedback component feeds a first voltage-changing signal, occurring in the input terminal of the transimdepance amplifier with the current signal, to the first terminal.

4 Claims, 3 Drawing Sheets

OPTICAL RECEIVING DEVICE

This Nonprovisional application claims priority under 35 U.S.C. § 119(a) on Patent Application No(s). 92130742 filed in TAIWAN on Nov. 4, 2003, the entire contents of which are hereby incorporated by reference.

BACKGROUND OF THE INVENTION

1. Field of the Invention

The present invention relates to an optical receiving device, and in particular to an optical receiving device for providing high operating bandwidth.

2. Description of the Related Art

In a conventional optical receiving device, a parasitic capacitor of a photodiode affects operating bandwidth and sensitivity of the device. Generally, when a value of the parasitic capacitor is large, it is difficult for the optical receiving device to operate with both high operating bandwidth and high sensitivity, thus increasing the difficulty in designing the optical receiving device.

FIG. 1 is a circuit diagram of a conventional optical receiving device. A cathode of a photodiode D1 is coupled to a voltage source VR1, and an anode thereof is coupled to an input terminal of a transimpedance amplifier T1. The transimpedance amplifier converts an optical current signal detected by the photodiode D1 to a voltage signal, and outputs the voltage signal Vout1 to back-end devices for data decision. A value of a capacitor Cd1 is a parasitic capacitance of the photodiode D1, a value of a resistor Rin1 is an input impedance of the transimpedance amplifier T1, and a value of a capacitor Cin1 is an input capacitance of the transimpedance amplifier T1. The resistor Rin1, the capacitor Cin1, and the capacitor Cd1 determine the operating bandwidth of the optical receiving device. The operating bandwidth is represented by the following formula:

$$B1 = \frac{1}{2\pi \cdot rin1(cin1 + cd1)}$$

wherein B1 represents the operating bandwidth, rin1 the value of the resistor Rin1, cin1 the value of the capacitor Cin1, and cd1 the value of the capacitor Cd1.

If the resistance rin1 is a constant, when the capacitance cd1 increases, the operating bandwidth B1 decreases. If the operating bandwidth B1 is kept as a constant, higher capacitance cd1 requires lower resistance rin1. Therefore, as the capacitance cd1 increase, so do difficulties in design of transimpedance amplifier.

As mentioned above, because the cathode of the photodiode D1 is coupled to the voltage source VR1, capacitor Cd1 of the photodiode D1 directly affects the bandwidth of the optical receiving device. However, if the voltage signal of the cathode is kept in phase with the voltage of the anode, the influence of the capacitor Cd1 on bandwidth is substantially decreased.

SUMMARY OF THE INVENTION

Accordingly, an object of the present invention is to provide an optical receiving device to keep the voltages of two terminals of the photodiode in phase to reduce the influence of the parasitic capacitance thereon, enhancing the operating bandwidth.

The present invention further provides an optical receiving device. The optical receiving device has a photodiode, transimpedance amplifier, and a feedback component. The photodiode has a first terminal coupled to the feedback component, and a second terminal. When detecting an optical signal, the photodiode generates a current signal from the second terminal. The transimpedance amplifier, whose input terminal is coupled to the second terminal, converts the current signal to a voltage signal and outputs the voltage signal from the output terminal of the transimpedance amplifier. The feedback component is coupled between the first terminal and the output terminal of the transimpedance amplifier. The feedback component transmits a first voltage-changing signal, occurring in the input terminal of the transimdepance amplifier with the current signal, to the first terminal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1:
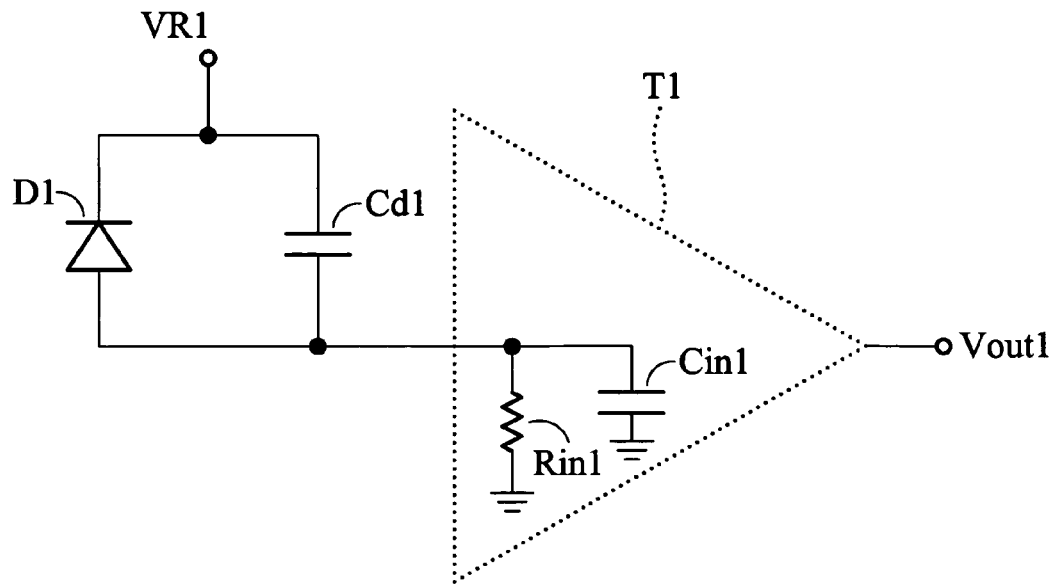
FIG. 1 is a circuit diagram of a conventional optical receiving device.
Figure 2:
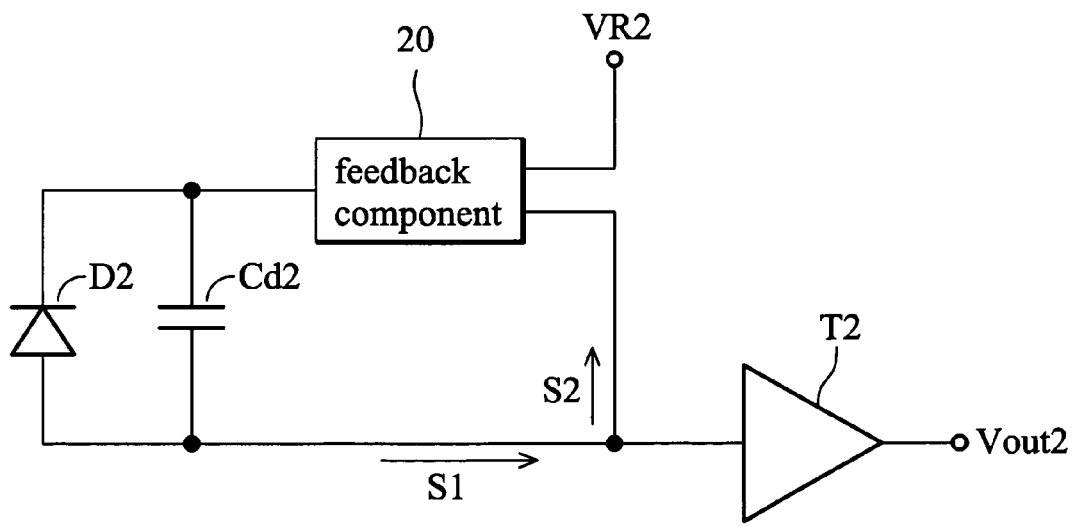
FIG. 2 is a base circuit diagram of an optical receiving device of the invention.

FIG. 2 is a base circuit diagram of an optical receiving device of the invention. A voltage source VR2 supplies a DC voltage control to a photodiode D2, such that photodiode D2 normally operates in the reverse-bias mode. The photodiode D2 has a parasitic capacitor Cd2. When sensing an optical signal, the photodiode D2 generates a current signal S1, and transmits the current signal S1 to the transimpedance amplifier T2. The transimdepance amplifier T2 converts the current signal S1 to a voltage signal, and outputs the voltage signal to back-end devices.

When transimdepance amplifier T2 receives the current signal S1, a signal disturbance occurs in an input terminal of the transimdepance amplifier T2, changing the voltage thereof. Thus, the generated voltage-changing signal S2 is transmitted to the feedback component 20 from the input terminal of the transimdepance amplifier T2. After receiving the voltage-changing signal S2, the feedback component 20 transmits the voltage-changing signal S2 to the cathode of the photodiode D2 with voltage of the voltage source VR2. As a result, in the photodiode D2, voltage of the cathode and that of the anode vary in phase, decreasing a value of the parasitic capacitor Cd2 in effect, in the equivalent circuit.

Figure 3:
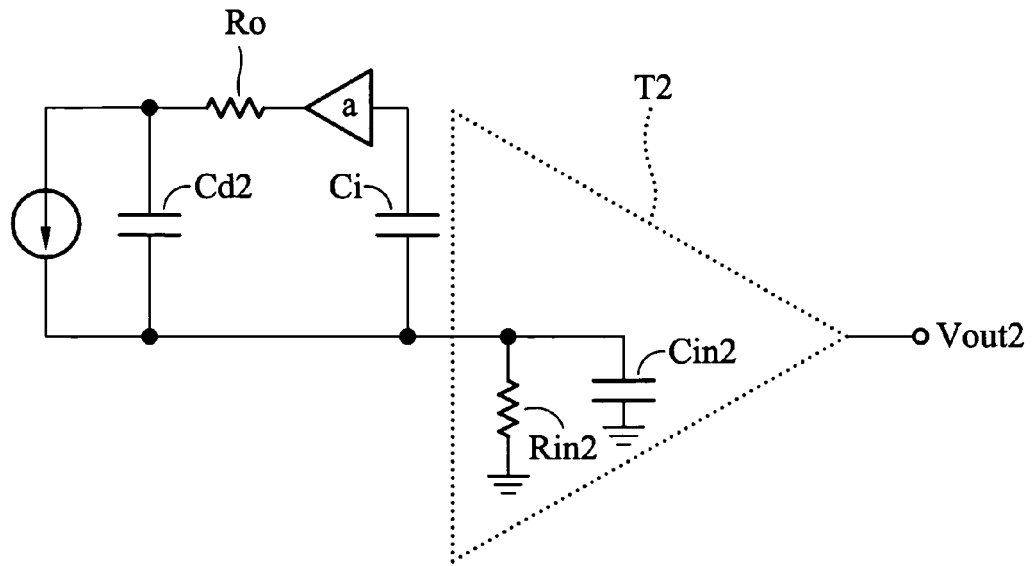
FIG. 3 shows a small-signal equivalent circuit of the circuit shown in FIG. 2.

FIG. 3 shows a small-signal equivalent circuit of the circuit shown in FIG. 2. A value of a resistor Rin2 is an input impedance of the transimpedance amplifier T2, and a value of a capacitor Cin2 is an input capacitance of the transimpedance amplifier T2. A value of a resistor Ro is an output impedance of the feedback component 30, and a value of a capacitor Ci is an input capacitance of the feedback component 30. It is assumed that the capacitor Ci can couple a complete AC voltage signal, and a transimpedance TZ is represented by the following formula:

$$TZ = \frac{rin2}{1 + s \cdot rin2(cin2 + k \cdot cd2) + s^2 \cdot rin2 \cdot ro \cdot cin2 \cdot cd2}$$

$$\text{and } k = (1-a) + \frac{ro}{rin2}$$

wherein a represents a gain of the transimpedance amplifier T2, rin2 the value of the resistor Rin2, cin2 the value of the capacitor Cin2, cd2 the value of the capacitor Cd2, and ro the value of the resistor Ro.

According to the formula, there are two poles Wc1 and Wc2 for the transimpedance response. The approximated result can be derived when Wc1<<Wc2, as follows $$Wc1 = \frac{1}{rin2 \cdot (cin2 + k \cdot cd2)},$$

$$\text{and } Wc2 = \frac{1}{ro \cdot cd2}\left(1 + k \cdot \frac{cd2}{cin2}\right)$$

Therefore, if the value of k is decreased, the capacitor Cd2 has less effect upon the bandwidth. The value of k is determined by the resistance ro of the feedback component 20. If a value of the gain a approaches 1 and the resistance ro is smaller, the value of k decreases and bandwidth is improved.

Figure 4:
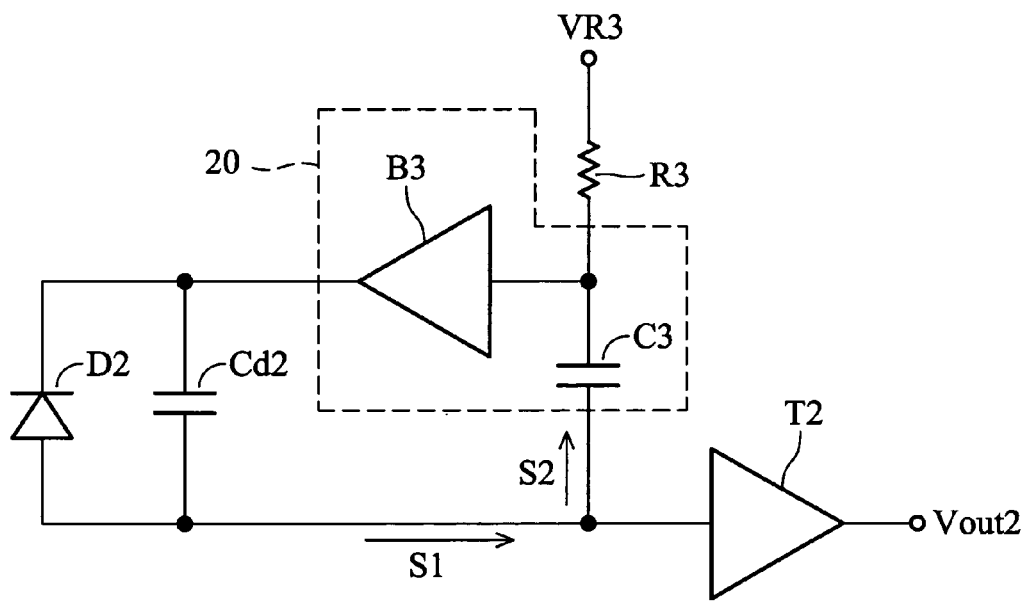
FIG. 4 is a circuit diagram of an optical receiving device of an embodiment.

FIG. 4 is a circuit diagram of an optical receiving device of an embodiment. The feedback component 20 comprises a coupling capacitor C3 and a buffer unit B3. A gain of the buffer unit B3 is approximate to and less than 1 to avoid instability. A DC operating voltage of the photodiode D2 is controlled by a voltage source VR3 via a resistor R3. A value of the resistor R3 is as large as possible to reduce noise and load effect.

Figure 5:
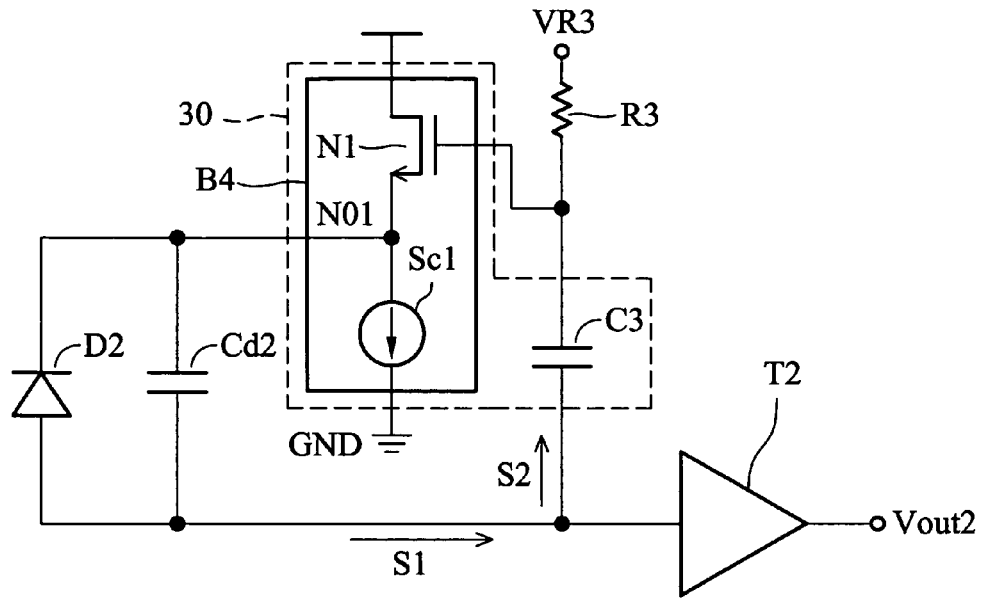
FIG. 5 shows an example of the embodiment.

FIG. 5 shows an example of the embodiment. Operations of the photodiode D2, the parasitic capacitor Cd2, and the transimpdance amplifier T2 are the same as described above. The DC operating voltage of the photodiode D2 is controlled by a voltage source VR3 via a resistor R3. The feedback component 30 comprises a coupling capacitor C3 and a buffer unit B4. The buffer unit B4 is a voltage follower comprises an NMOS transistor N1 and a current source SC1. A source of the NMOS transistor N1 is coupled to a terminal of the current source SC1 at a node NO1, and the other terminal of the current source SC1 is coupled to a reference code GND. A gate of the NMOS transistor N1 is coupled to the coupling capacitor C3.

When the photodiode D2 senses an optical signal, a current signal S1 is generated, and a signal disturbance occurs in an input terminal of the transimdepance amplifier T2, generating a voltage-changing signal S2. The voltage-changing signal S2 is transmitted to the gate of the NMOS transistor N1 through the coupling capacitor C3, and then transmitted to the cathode of the photodiode D2 through the voltage follower composed by the NMOS transistor N1 and the current source SC1. Thus, in the photodiode D2, voltage of the cathode and that of the anode vary in phase, decreasing the value of the parasitic capacitor Cd2 in effect, in the equivalent circuit.

Figure 6:
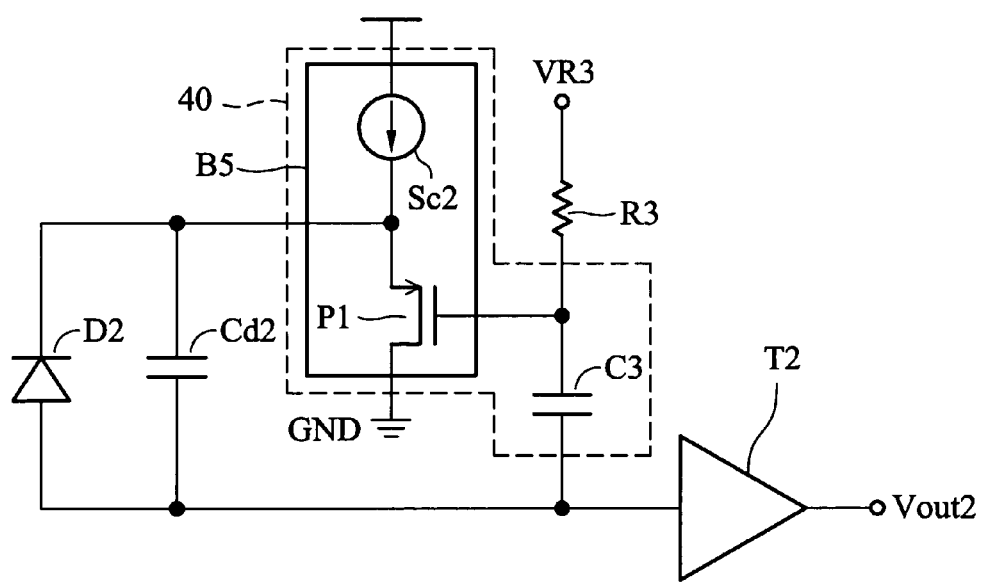
FIG. 6 shows another example of the embodiment.

FIG. 6 shows another example of the embodiment, in which feedback component 40 of FIG. 6 differs from the feedback component 30 of FIG. 5. The feedback component 40 comprises a coupling capacitor C3 and a buffer unit B5. The buffer unit B5 is a voltage follower comprises a PMOS transistor P1 and a current source SC2. A source of the PMOS transistor P1 is coupled to a terminal of the current source SC2 at a node NO2. Drain of the PMOS transistor P1 is coupled to the reference code GND, and a gate of the PMOS transistor P1 is coupled to the coupling capacitor C3.

When the photodiode D 2 detects an optical signal, a current signal S1 is generated, and a signal disturbance occurs in an input terminal of the transimdepance amplifier T2, generating a voltage-changing signal S2. The voltage-changing signal S2 is transmitted to the gate of the PMOS transistor P1 through the coupling capacitor C3, and then transmitted to the cathode of the photodiode D2 through the voltage follower comprising the PMOS transistor P1 and the current source SC2. Thus, in the photodiode D2, voltage of the cathode and that of the anode vary in phase, decreasing the value of the parasitic capacitor Cd2 in effect, in the equivalent circuit.

According the optical receiving device of the invention, a voltage-changing signal, occurring in an input terminal of a transimdepance amplifier, is fed back to a cathode of a photodiode. As result, the two terminals of the photodiode are virtual-short for a small-signal equivalent circuit, reducing capacitance effect of a parasitic of the photodiode. In the invention, it is better for the optical receiving device that a value of a gain of a feedback component is less than 1, and a output impedance of the feedback component is kept as smaller as possible. In order to provide the reverse bias voltage for the photodiode, applicable voltage can be supplied to the photodiode through the back-end component.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical receiving device, comprising:
    a photodiode having a first terminal coupled to a voltage source, and a second terminal, wherein when detecting an optical signal, the photodiode generates a current signal output from the second terminal;
    a transimpedance amplifier, whose input terminal is coupled to the second terminal, for converting the current signal to a voltage signal and outputting the voltage signal from the output terminal of the transimpedance amplifier;
    a coupling unit coupled to the second terminal and the input of the transimpedance amplifier; and
    a buffer unit coupled to the coupling unit and being a voltage follower comprising a transistor and a current source, coupled between the voltage source and a reference code in series, wherein a connection node of the voltage source and the reference code is coupled to the first terminal, and a gate of the transistor is coupled to the coupling unit; and wherein the coupling unit couples a first voltage-changing signal, occurring in the input terminal of the transimdepance amplifier with the current signal, to an input terminal of the buffer unit, and after receiving the first voltage-changing signal, the buffer unit outputs a second voltage-changing signal to the first terminal.

2. The optical receiving device as claimed in claim 1, wherein the coupling unit is a capacitor.

3. The optical receiving device as claimed in claim 2, further comprising a resistor coupled between the voltage source and the input terminal of the buffer unit.

4. The optical receiving device as claimed in claim 2, further comprising a resistor coupled between the voltage source and the first terminal.

* * * * *